United States Patent
Küsel (10) Patent No.: US 6,702,103 B1
(45) Date of Patent: Mar. 9, 2004

(54) DEVICE FOR MONITORING A TUBULAR BELT CONVEYOR SYSTEM

(75) Inventor: Bernd Küsel, Hamburg (DE)

(73) Assignee: Phoenix AG, Hamburg (DE)

(*) Notice: Subject to any disclaimer, the term of this patent is extended or adjusted under 35 U.S.C. 154(b) by 0 days.

(21) Appl. No.: 10/019,709

(22) PCT Filed: Jun. 15, 2000

(86) PCT No.: PCT/DE00/01959

§ 371 (c)(1),
(2), (4) Date: Dec. 27, 2001

(87) PCT Pub. No.: WO01/02272

PCT Pub. Date: Jan. 11, 2001

(30) Foreign Application Priority Data

Jun. 29, 1999 (DE) .......................... 199 29 580

(51) Int. Cl.⁷ ............................. B65G 43/00
(52) U.S. Cl. ................. 198/810.03; 198/502.1; 198/819
(58) Field of Search ................ 198/502.1, 502.4, 198/810.03, 820, 821, 826, 819

(56) References Cited

U.S. PATENT DOCUMENTS

| 5,042,646 | A | * | 8/1991 | Beatty | ............... | 198/819 |
| 5,328,023 | A | * | 7/1994 | Hinkelmann et al. | ....... | 198/847 |
| 5,378,493 | A | * | 1/1995 | Zivkovic | ............... | 427/8 |
| 5,511,652 | A | * | 4/1996 | McGinnis | ............... | 198/819 |

FOREIGN PATENT DOCUMENTS

| DE | 28 54 562 | | 6/1980 |
| DE | 31 22 664 | | 9/1982 |
| DE | 34 17 718 | | 11/1984 |
| DE | 44 15 544 | | 8/1995 |
| DE | 195 22 757 | | 1/1996 |
| DE | 195 19 607 | | 12/1996 |
| DE | 197 16 178 | | 11/1998 |
| EP | 0 329 224 | | 8/1989 |
| FR | 2 758 932 | | 7/1998 |
| JP | 0036211 | * | 2/1987 |
| JP | 405105221 | * | 4/1993 |

* cited by examiner

*Primary Examiner*—Richard Ridley
(74) *Attorney, Agent, or Firm*—Collard & Roe, P.C.

(57) ABSTRACT

The invention relates to a device for monitoring a tubular belt conveyor system, comprising the following: a conveyor belt consisting of an elastomeric material, especially with embedded tie rods, the conveyor belt being closed to form a tubular belt by overlapping its longitudinal edges so as to form an overlap area; other system parts, i.e., a driving drum, a tail pulley, support rollers, guide rollers, supporting structures and optionally, other parts. The inventive device is characterized in that the device for monitoring the overlap area of the tubular belt is provided with an optoelectronic system. In the event of a deviation from the desired conveyor belt overlap, the optoelectronic system initiates a correction of position by means of the guiding rollers. If the corrective measures are not taken within a certain period, the tubular belt conveyor system is automatically disconnected.

9 Claims, 7 Drawing Sheets

DEVICE FOR MONITORING A TUBULAR BELT CONVEYOR SYSTEM

CROSS REFERENCE TO RELATED APPLICATIONS

Applicant claims priority under 35 U.S.C. §119 of German Application No. 199 29 580.8 filed Jun. 29, 1999. Applicant also claims priority under 35 U.S.C. §120 of PCT/DE00/01959 filed Jun. 15, 2000. The international application under PCT article 21(2) was not published in English.

DESCRIPTION

The invention relates to a device for monitoring a tubular belt conveyor system comprising the following:
- a conveyor belt consisting of an elastomeric material, particularly with embedded tie rods, whereby the conveyor belt can be closed so as to form a tubular belt by overlapping its longitudinal edges to form an overlap area; as well as
- other system components such as a driving drum, a reversing drum, support rollers, guide rollers, supporting structures, as well as other optional components, if need be.

Tubular conveyor belts (pipe conveyor belts for encapsulated conveyance) are predominantly employed where bulk material has to be conveyed in a relatively confined space through horizontal and vertical curves.

Such conveyor systems have been used in the last few years also for conveying material over distances longer than 1 kilometer by virtue of their special adaptability to the topographical conditions.

In addition to their adaptability to the terrain, the advantages offered by tubular belts include the protection of the transported material against environmental influences (rain, wind, etc.) and the protection of the environment against material dropping from the conveyor belt (ashes from power plants; gypsum etc.).

Problems arise in connection with the operation of tubular conveyor belts with the guidance of the overlapping parts of the belt. The support and guide rollers of the system are responsible for correctly running the tubular conveyor belt (DE-C-31 22 664). Said rollers are individually aligned depending on the course the conveyor system is running.

The function of said rollers is influenced by varying weather and temperature conditions and by the wear, as well as by design defects.

Moisture, for example, reduces the value of the friction between the roller and the conveyor belt, which results in guidance that is not optimal.

The tubular belt is opened for loading and unloading, i.e. it is driven into a horizontal position. If the area of overlap of the tubular belt has not been guided into the correct position, i.e. if said overlap area is located at the bottom instead of at the top, for example as it is running up on the ejecting drum, the conveyor belt will be folded or it will run off of the drum sideways. Both events lead to substantial damage to the tubular conveyor belt and have to be absolutely avoided for that reason.

Said problem has been solved until now by forcibly guiding the conveyor belt over finger rollers projecting into the cross section of the tubular belt (DE-C-34 17 718), among other measures. Said method is successful in most cases; however, it is afflicted with the substantial drawback that the conveyor belt is attacked and damaged by the finger rollers. Said method consequently does not represent any satisfying permanent solution.

Now, a device for monitoring a tubular conveyor belt system is introduced in laid-open patent specification DE-A195 22 757, which employs detectors specifically in the form of the two following variations:
- The conveyor belt is provided on its outer side with a detectable color marking. This, however, requires that the surface marking will not be damaged or soiled, which, however, cannot be avoided in most cases. The result will then be that the system is no longer capable of fulfilling its function, or satisfying it only to a limited extent.
- The conveyor belt comprises detectable integrated indicators in particular in conjunction with steel cable belts, whereby individual cables or cords are replaced by the indicator. The drawback in this case is that the behavior of the tie rods of the conveyor belt might be adversely affected.

Therefore, the problem of the invention is to provide a conveyor system that excludes the drawbacks described above. Furthermore, the aim is that the system can be employed for all types of conveyor belts (steel cable conveyor belts, textile conveyor belts, aramide conveyor belts), as well as for all kinds of different conveyor constellations (curves, uphill gradients etc.), namely under the aspect of encapsulated conveyance. Moreover, the aim is that the conveyor system is free of wear, low in maintenance, and economical with as little technical expenditure as possible.

Said problem is solved according to the characterizing part of claim 1 in that the device for monitoring the overlap area of the tubular belt is provided with an optoelectronic system which, in the event the desired overlap of the conveyor belt is deviating, initiates a corrective setting by means of the guide rollers or, if the corrective measures are not successful within a preset period of time, automatically effects the shutdown of the tubular belt conveyor system.

Useful variations of the invention are specified in claims 2 to 11.

The invention is now explained in the following with the help of exemplified embodiments and by reference to schematic drawings, in which.

The following list of reference symbols is applicable in connection with the figures:

1 Tubular belt conveyor system
2 Tubular belt
3 Normal position of overlap area
4 Driving drum (loading drum)
5 Reversing drum (ejecting drum)

Figure 1:
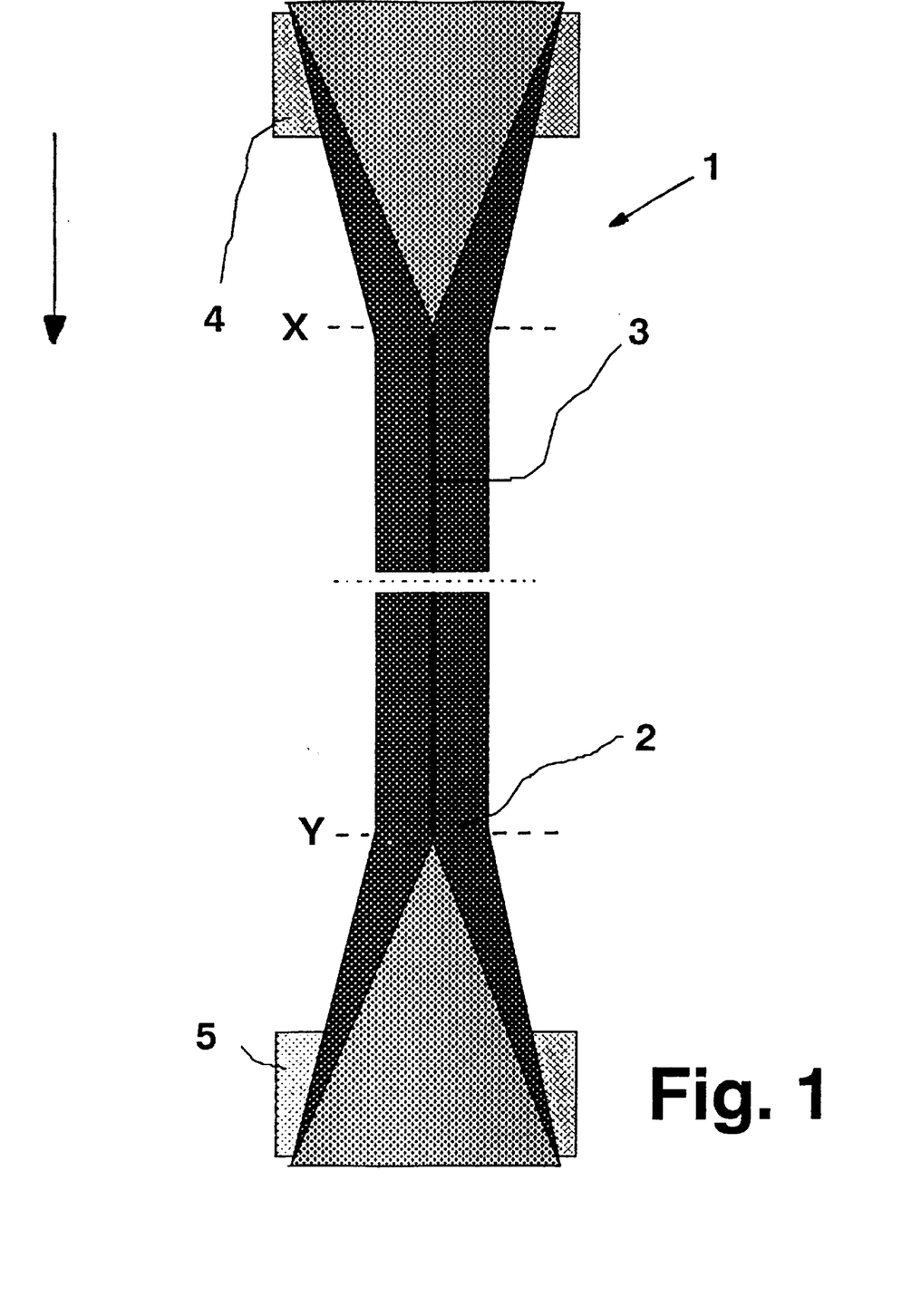
FIG. 1 is a top view of a tubular belt conveyor system with closed and open sections.

6 Wrong position of overlap area
7 Folded conveyor belt in upper strand
8 Folded conveyor belt in lower strand
9 Tie rod
10 Visible edge of tubular belt
11 Invisible edge of tubular belt
12 Optoelectronic system (digital line or area camera u, v, w)
13 Light source
14 Guide rollers
15 Process computer
16 Guide rollers control
17 Drive control
A Left side of belt in moving direction
B Right side of belt in moving direction
C Overlap area
X Closing of conveyor belt to form a tubular belt
Y Opening of tubular belt
Z Light beam FIG. 1 shows the upper strand of a tubular conveyor belt system 1 where the material is conveyed. The driving drum 4 is at the same time the loading drum (material loading area) where the material is transported in the direction indicated by the arrow. Within the area X, the conveyor belt is closed by overlapping its longitudinal edges so as to form a tubular belt 2, whereby the normal position 3 of the overlap is shown, i.e. the desired position. Within the area Y, the tubular belt 2 is then opened again. On the reversing drum 5, which is at the same time the ejecting drum (material unloading area), the conveyor belt changes into the lower strand, forming there a tubular belt as well; however, without transporting any material.

Now, the optoelectronic system 12 (FIGS. 5 to 7) is preferably mounted in the area Y, notably on both the upper and lower strands of the belt.

Figure 2:
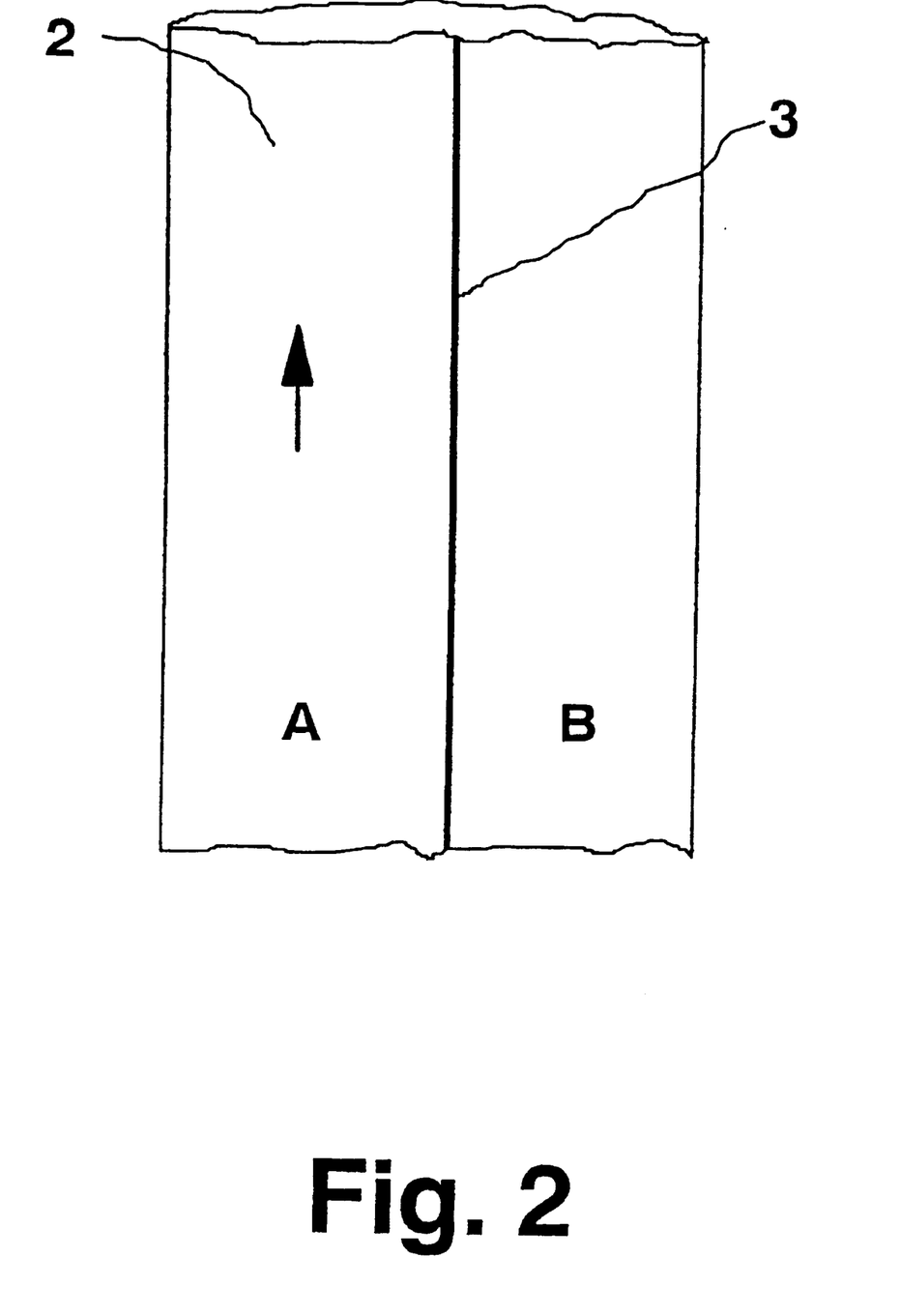
FIG. 2 is a top view of a tubular belt with the overlap area in the normal position.

FIG. 2 shows again the tubular belt 2 in the moving direction (direction of arrow) with the overlap in the normal position 3, forming a left belt side A and a right belt side B with a substantially symmetrical association.

Figure 3:
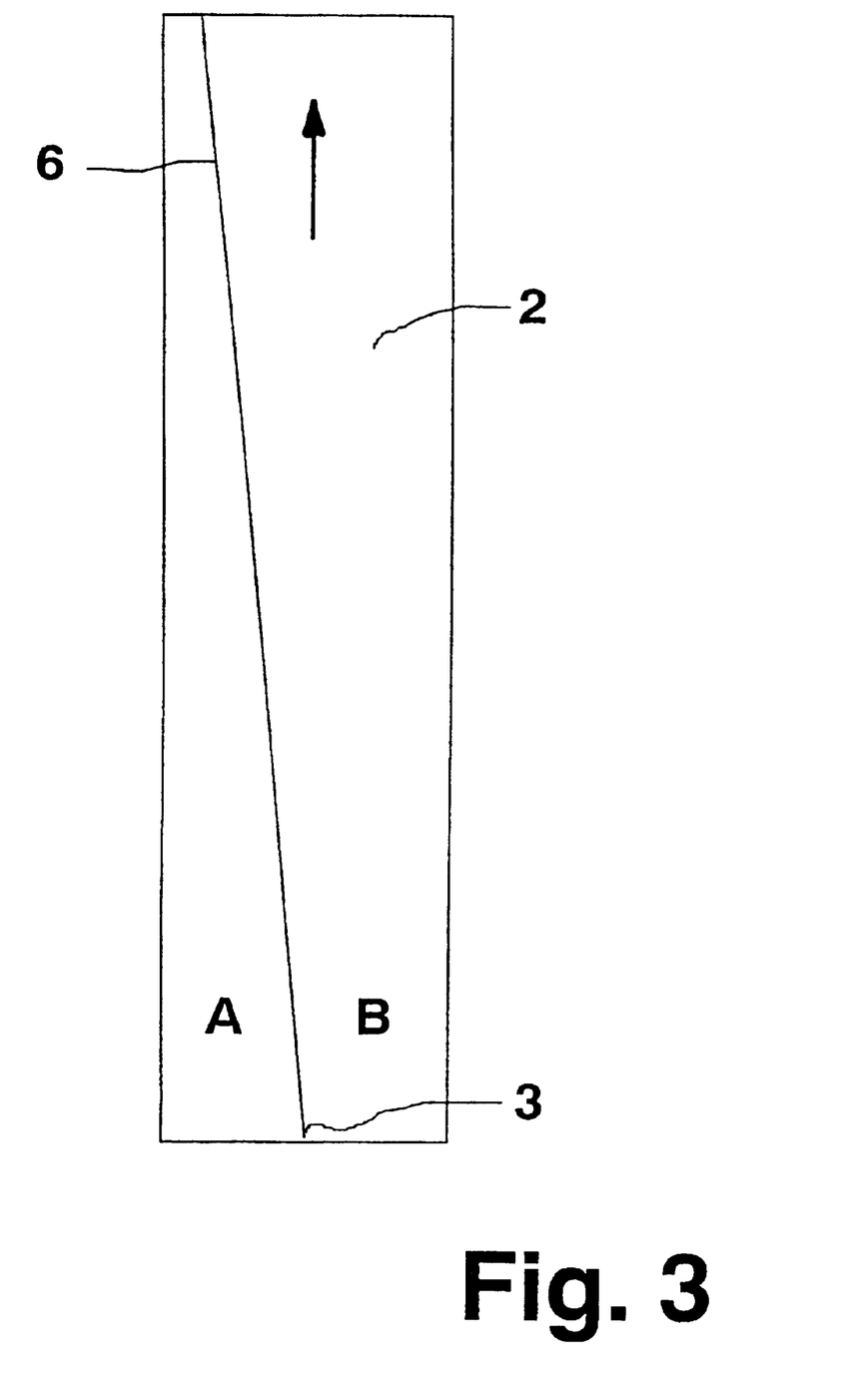
FIG. 3 is a top view of a tubular belt with the overlap area in a wrong position.

Now, FIG. 3 shows a tubular belt 2 with the overlap in the wrong position 6 in relation to the correct position 3, notably with a lateral shift of the overlap (=twisted belt) toward the left belt side A.

Figure 4:
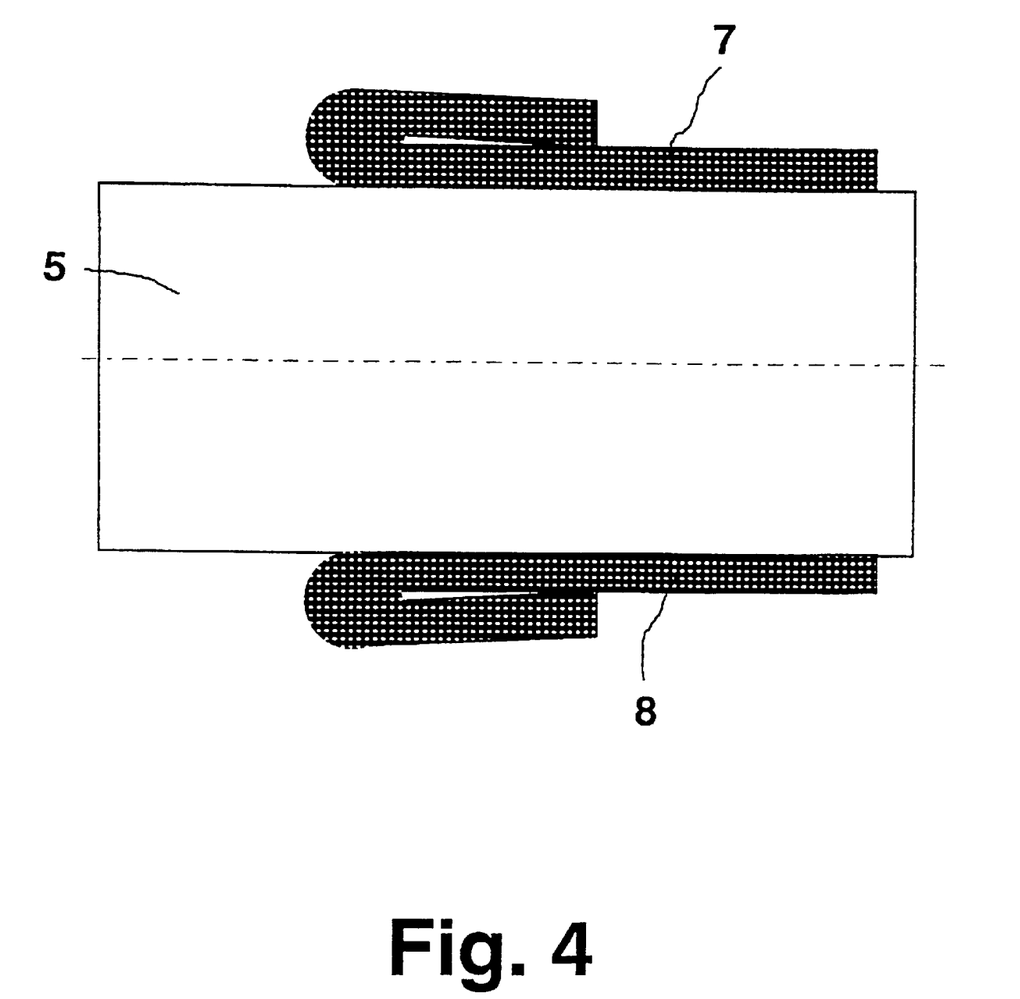
FIG. 4 shows the area of the reversing drum with the conveyor belt folded in the upper and lower strands of the belt.

FIG. 4, furthermore, shows the possible consequences if the overlap is in the wrong position according to FIG. 3, whereby the longitudinal edges of the conveyor belt 7 and 8 are folded within the area of the reversing drum 5 in the upper and lower strands, which is undesirable.

Figure 5:
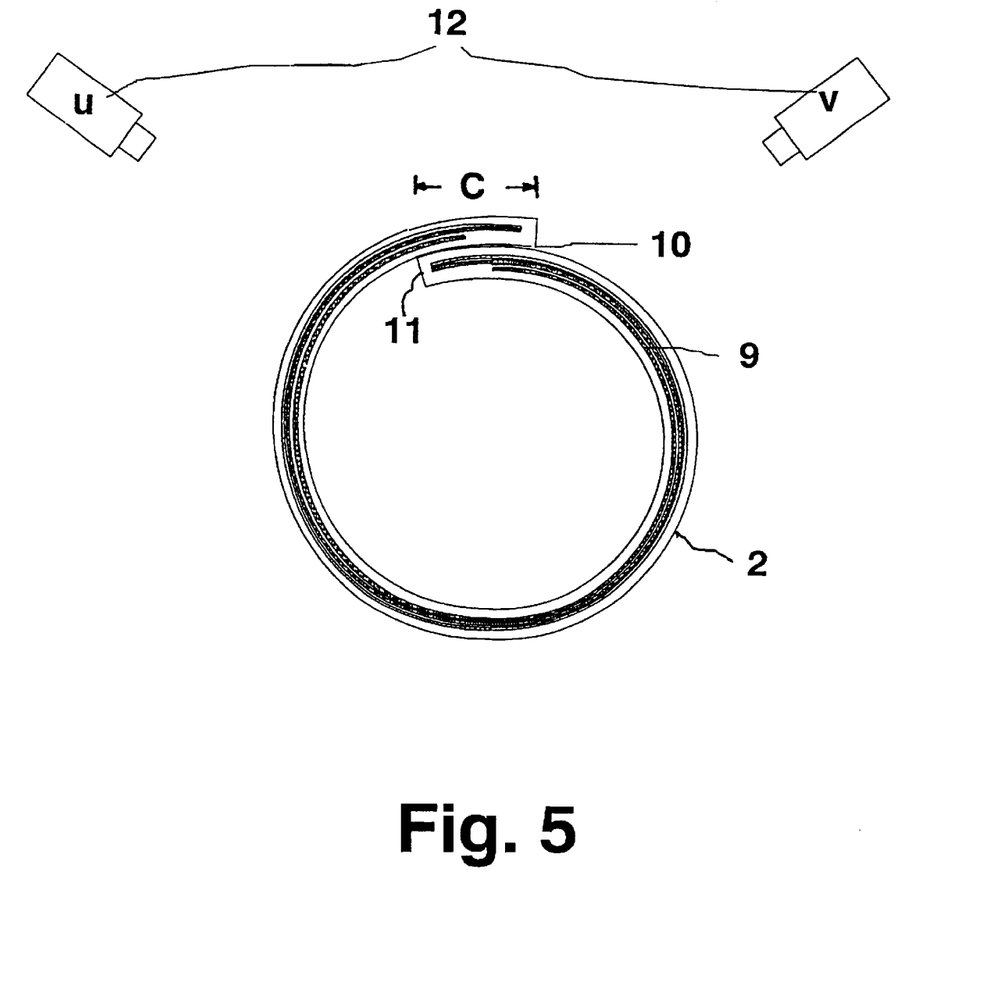
FIG. 5 shows the cross section of a tubular belt with embedded tie rods, as well as with two cameras monitoring the overlap area.

According to FIG. 5, the tubular belt 2 is provided with a tie rod 9 in the form of a multi-layer fabric. The overlap area C of the tubular belt 2 extends in this connection from the visible edge 10 up to the invisible edge 11.

The optoelectronic system 12 is formed by the two digital line or area cameras "u" and "v", whereby particularly digital line cameras are employed. The two cameras each are arranged laterally of the overlap area C of the tubular belt 2 notably with respect to the normal position 3 (FIGS. 1 and 2) of the overlap.

Now, if a wrong position 6 (FIG. 3) occurs, the optoelectronic system 12 responds accordingly, which is explained later in the following in connection with FIG. 7.

Figure 6:
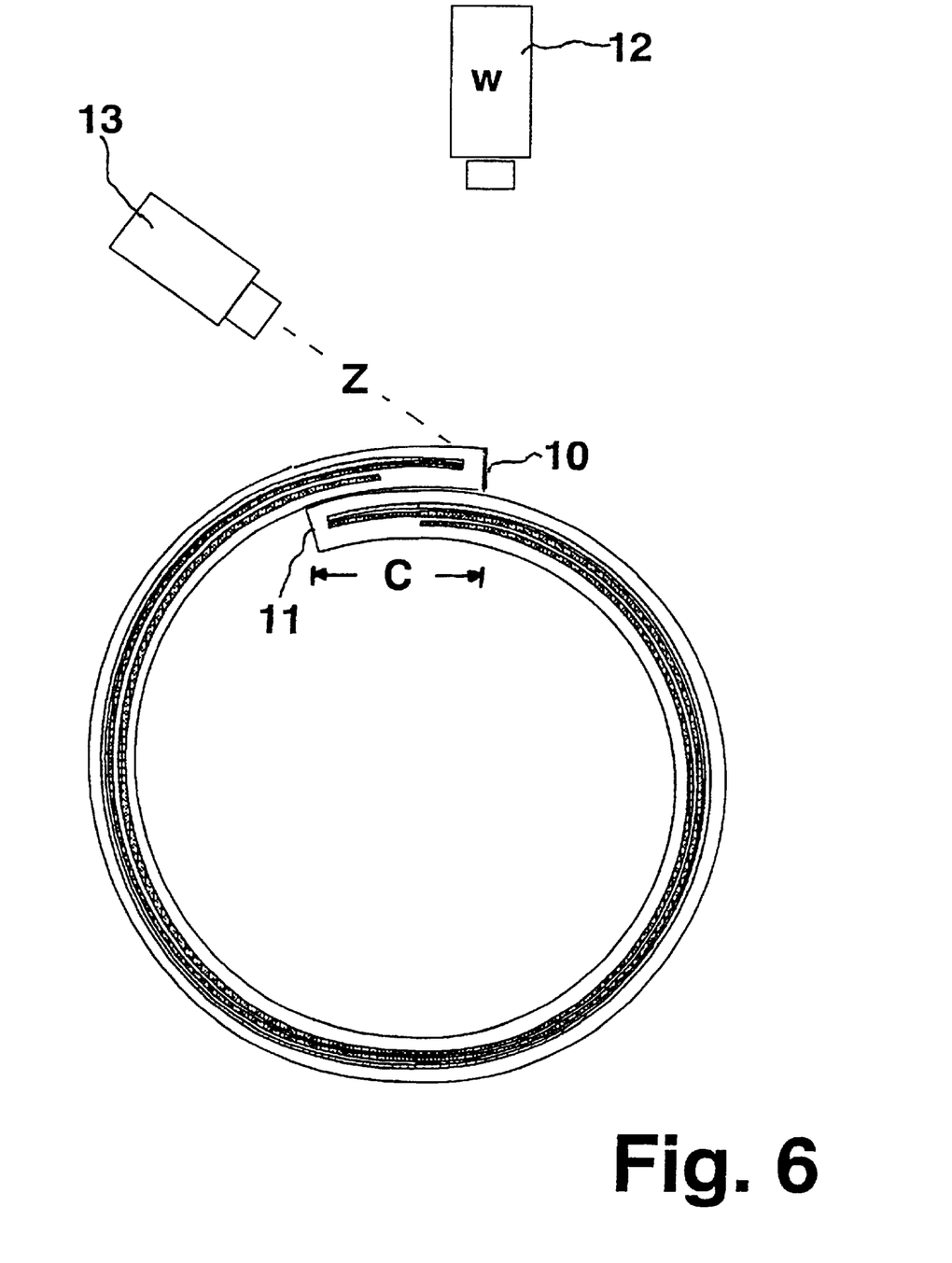
FIG. 6 shows the cross section of a tubular belt according to FIG. 5 with one camera and an additional camera and an additional light source.

FIG. 6 shows the same tubular belt 2 according to FIG. 5 with the overlap area C. In the present case, the optoelectronic system 12 in the form of one single digital or area camera "w" is substantially mounted directly above the visible edge 10 of the tubular belt, notably with observation of the course followed by the edge and thus of the overlap area C. An additional light source 13, of which the light beam Z is substantially aligned in the direction. of the area of the visible edge 10 of the tubular belt, supports the observation of the course run by the edge or the overlap area C.

Figure 7:
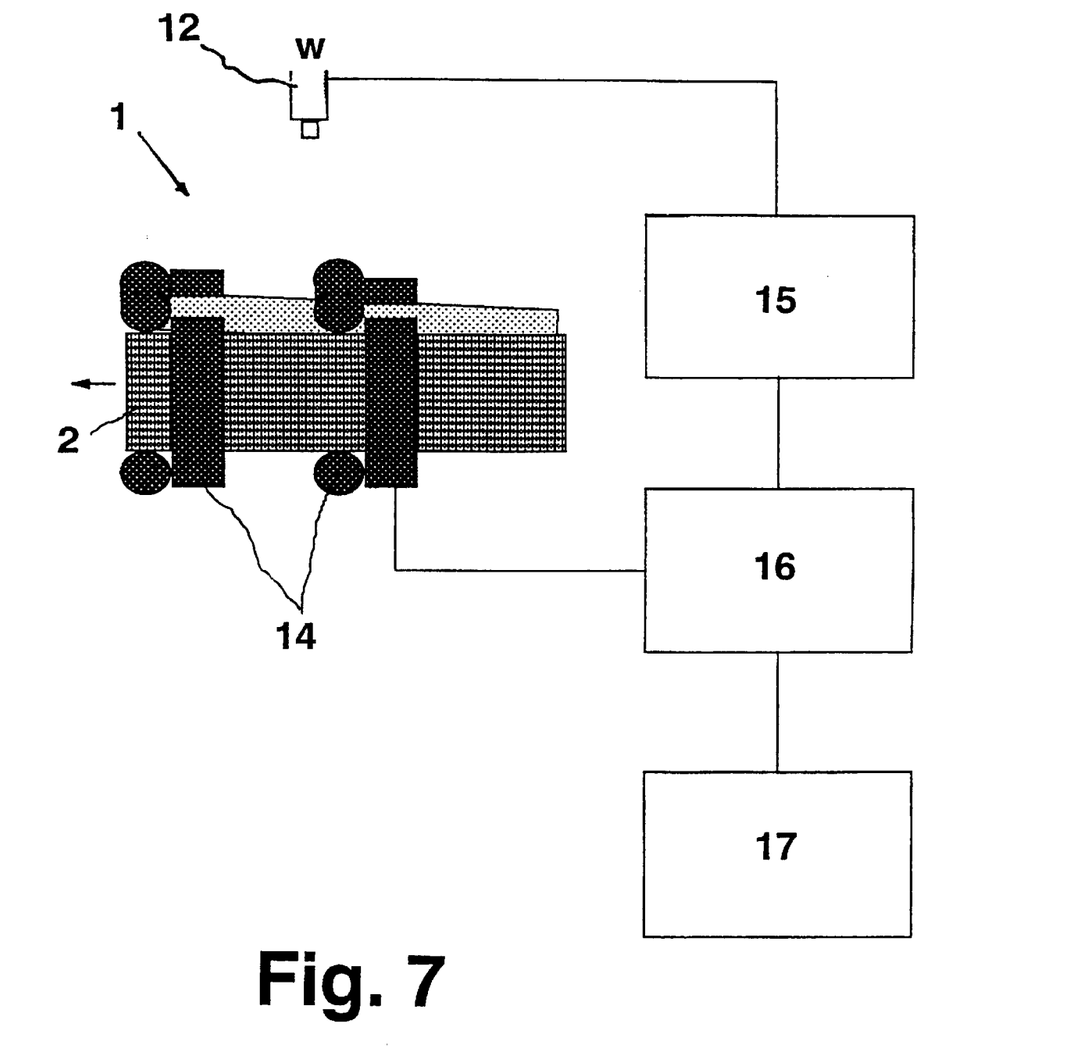
FIG. 7 shows a tubular belt conveyor system as well as the operational principle of the optoelectronic system working in conjunction with a process computer, a control for the guide rollers and a drive control.

According to FIG. 7, the optoelectronic system 12 is coupled with a process computer 15, a guide roller control 16 and a drive control 17. Said overall system has the two following important functions:

(1) A signal conforming to the quantity of the deviation is transmitted by at least one camera "w" to the process computer 15, which controls the required corrective setting of one or more of the guide rollers 14 of the conveyor system 1. Any migration of the overlap toward the left or right side leads to counter-steering to the left or right side. The guide roller control 16 as a compensating control is active until the overlap is guided back into a programmed tolerance field recognized by the camera "w".

(2) If the overlap migrates out of a defined tolerance field, or if corrective measures fail to lead to success within a preset period of time, the camera "w" generates an emergency signal leading to shutdown of the conveyor system via the process computer 15, notably in conjunction with the drive control 17.

Furthermore, it is advantageous if the optoelectronic system is equipped with a device blowing it clear. The optics is kept clean in this manner.

What is claimed is:

1. A device for monitoring a tubular belt conveyor system comprising:

a conveyor belt made of elastomeric material with embedded tie rods, longitudinal edges, an open section and a closed section wherein the longitudinal edges have a desired overlap to form a tubular belt with an overlap area;

a driving drum;

a reversing drum;

support rollers;

guide rollers; and supporting structures;

wherein said device comprises an optoelectronic system mounted where the closed section meets the open section for monitoring the overlap area comprising at least one light source whose light beam is aligned with the overlap area, said optoelectronic system, if deviation from the desired overlap occurs, initiating a corrective setting by means of the guide rollers and, it the desired overlap does not occur within a preset period of time, effecting an automatic shutdown of the tubular belt conveyor system.

2. A device for monitoring a tubular belt conveyor system comprising:

a conveyor belt made of elastomeric material with embedded tie rods, longitudinal edges, an open section and a closed section wherein the longitudinal edges have a desired overlap to form a tubular belt with an overlap area;

a driving drum;

a reversing drum;

support rollers;

guide rollers; and supporting structures;

wherein said device comprises an optoelectronic system coupled with a process computer, a guide roller control and a drive control for monitoring the overlap area comprising at least one light source whose light beam is aligned with the overlap area, said optoelectronic system, if deviation from the desired overlap occurs, initiating a corrective setting by means of the guide rollers and, if the desired overlap does not occur within a preset period of time, effecting an automatic shutdown of the tubular belt conveyor system.

3. The device according to claim 1, wherein the optoelectronic system comprises at least one digital line or area camera.

4. The device according to claim 2, wherein the optoelectronic system is mounted directly above the overlap area of the tubular belt.

5. The device according to claim 4, wherein the optoelectronic system is substantially mounted directly above a visible edge of the tubular belt.

6. The device according to claim 2, wherein the optoelectronic system is mounted laterally of the overlap area of the tubular belt.

7. The device according to claim 2, wherein the light source is mounted approximately above an invisible edge of the tubular belt.

8. The device according to claim 2, wherein the light beam of the light source is substantially aligned in the direction of a visible edge of the tubular belt.

9. The device according to claim 1, wherein the optoelectronic system is equipped with a compressed-air clearing device.

* * * * *